United States Patent
Yoshikawa et al.

(10) Patent No.: US 7,904,836 B2
(45) Date of Patent: Mar. 8, 2011

(54) IMAGE REPRODUCTION METHOD, IMAGE REPRODUCTION DEVICE AND DIGITAL CAMERA

(75) Inventors: Hiroki Yoshikawa, Osaka (JP); Masahiro Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 11/785,802

(22) Filed: Apr. 20, 2007

(65) Prior Publication Data
US 2007/0258695 A1 Nov. 8, 2007

(30) Foreign Application Priority Data
Apr. 20, 2006 (JP) .................... 2006-116806

(51) Int. Cl.
*G06F 3/048* (2006.01)
(52) U.S. Cl. ......... 715/860; 715/730; 715/838; 715/857; 715/863
(58) Field of Classification Search .................. 715/720, 715/730, 732, 838, 857, 860, 863
See application file for complete search history.

(56) References Cited

U.S. PATENT DOCUMENTS

| | | | |
|---|---|---|---|
| 6,215,523 B1 * | 4/2001 | Anderson | 348/333.05 |
| 6,781,629 B2 * | 8/2004 | Ohnogi | 348/333.01 |
| 7,349,012 B2 * | 3/2008 | Takezawa et al. | 348/222.1 |
| 7,450,169 B2 * | 11/2008 | Jeon et al. | 348/333.11 |
| 7,515,192 B2 * | 4/2009 | Sekiguchi | 348/333.05 |
| 2005/0089301 A1 * | 4/2005 | Sekiguchi | 386/4 |
| 2006/0056817 A1 | 3/2006 | Nishihata | |
| 2007/0183749 A1 | 8/2007 | Yamada et al. | |

FOREIGN PATENT DOCUMENTS

| | | |
|---|---|---|
| JP | 10-63688 A | 3/1998 |
| JP | 10-79913 A | 3/1998 |
| JP | 2001-8071 A | 1/2001 |
| JP | 2002-101329 A | 4/2002 |
| WO | WO 2005/117011 A1 | 12/2005 |

OTHER PUBLICATIONS

Chinese Office Action, w/ English translation thereof, issued in Chinese Patent Application No. CN 200710097122.7 dated Feb. 5, 2010.

* cited by examiner

*Primary Examiner* — Ba Huynh
(74) *Attorney, Agent, or Firm* — McDermott Will & Emery LLP

(57) ABSTRACT

An image reproduction method includes: a reduced-size image reading step of reading a plurality of reduced-size images from a recording medium and storing the reduced-size images in a memory; a display step of multi-displaying the plurality of reduced-size images on a monitor; a cursor movement detection step of detecting a moving speed of a cursor indicating a selected reduced-size image from the plurality of reduced-size images displayed on the monitor; and an image read-ahead step of reading images from the recording medium according to the moving speed of the cursor and storing the image in the memory.

7 Claims, 9 Drawing Sheets

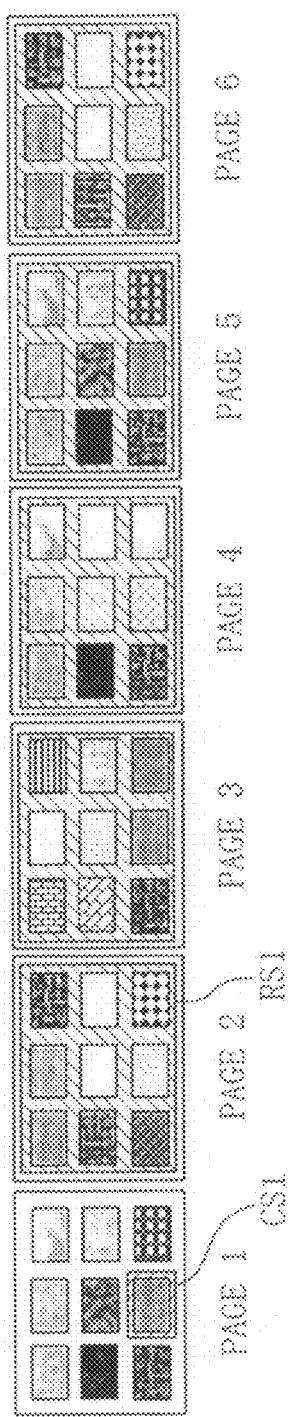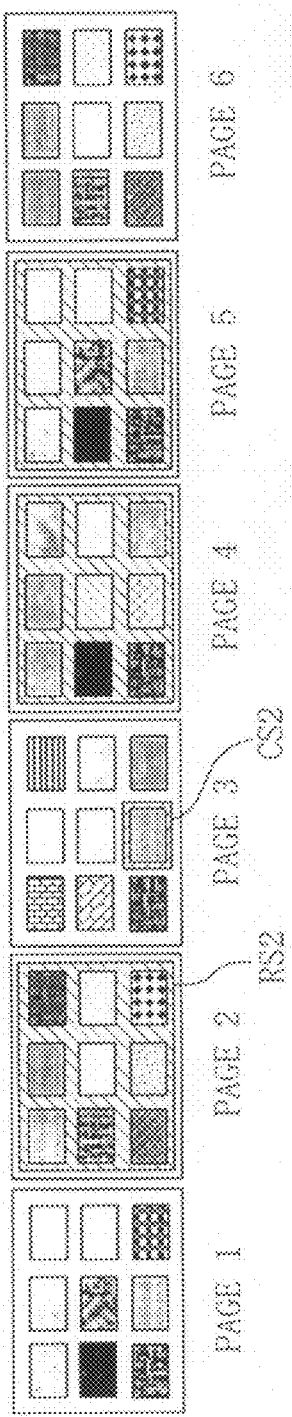

| MOVING SPEED | NUMBER OF IMAGES TO BE READ | READ DIRECTION |
|---|---|---|
| 0 | 1 (MAIN IMAGE) | N/A |
| 1 | 2 PAGES | PREVIOUS AND NEXT PAGES |
| 2 | 3 PAGES | PREVIOUS AND NEXT PAGES |
| 3 | 4 PAGES | FORWARD DIRECTION |
| 4 | 5 PAGES | FORWARD DIRECTION |
| 5 | 6 PAGES | FORWARD DIRECTION |
| ⋮ | ⋮ | ⋮ |

THRESHOLD OF CHANGING READ DIRECTION
[PREVIOUS/NEXT PAGES OR FORWARD DIRECTION]: 3

(MOVING SPEED OF CURSOR: LOW, MEMORY UTILIZATION: LOW)

(MOVING SPEED OF CURSOR: HIGH, MEMORY UTILIZATION: LOW)

(MOVING SPEED OF CURSOR: HIGH, MEMORY UTILIZATION: LOW)

IMAGE REPRODUCTION METHOD, IMAGE REPRODUCTION DEVICE AND DIGITAL CAMERA

CROSS-REFERENCE TO RELATED APPLICATION

The disclosure of Japanese Patent Application No. 2006-116806 filed on Apr. 20, 2006 including specification, drawings and claims are incorporated herein by reference in its entirety.

BACKGROUND OF THE INVENTION

The present invention relates to image reproduction devices for reproducing image data stored in a recording medium or the like.

In recent years, the performance of devices, such as a digital camera and the like, for recording/reproducing an image have been rapidly improved and such devices have become capable of taking a highly resolution image. Accordingly, a size of data of an image is increased and a longer time is required to reproduce the image. With increase in capacity of recording medium, a large amount of image data can be stored and thus, when a user wants to reproduce an image from a recording medium, the user has to find a desired image from a large number of images. Then, it is desired to quickly reproduce a plurality of images and makes it easier for a user to find a desired image.

To meet such needs, image reproduction devices in which a read-ahead operation to view thumbnail images and a main image is performed are disclosed, for example, in Japanese Laid-Open Publication No. 2002-101329 and Japanese Laid-Open Publication No. 2001-8071. Also, an image reproduction device for displaying thumbnail images which require only short time for image reproduction and then a main image is disclosed, for example, in Japanese Laid-Open Publication No. 10-79913. Moreover, for example, Japanese Laid-Open Publication No. 10-63688 discloses an image reproduction device in which with a plurality of images skipped, a desired image is displayed, so that an image to be reproduced can be detected at high speed.

However, in a known image reproduction device, when read-ahead of images is performed in a multi-reproduction mode in which a plurality of reduced-size images are displayed in a single page, only reduced-size images in adjacent pages to a displayed page are read ahead and a large number of images have to be read out at a time when a page is turned. Thus, at a time of page turning, a display operation of a new page after page turning and a read-ahead operation of a large number of images (thumbs) have to be performed at the same time. Therefore, it takes a long time to reproduce a new page.

SUMMARY OF THE INVENTION

It is therefore an object of the present invention to provide an image reproduction device in which a waiting time for reproduction of an image stored in a recording medium is reduced.

Specifically, the present invention provides an image reproduction method including: a reduced-size image reading step of reading a plurality of reduced-size images from a recording medium and storing the reduced-size images in a memory; a display step of multi-displaying the plurality of reduced-size images on a monitor; a cursor movement detection step of detecting a moving speed of a cursor indicating a selected reduced-size image from the plurality of reduced-size images displayed on the monitor; and an image read-ahead step of reading images from the recording medium according to the moving speed of the cursor and storing the image in the memory.

Thus, read-ahead of images is performed according to the moving speed of the cursor indicating a selected reduced-size image. Therefore, proper read-ahead can be performed to reproduce an image within a short waiting time.

It is preferable that the image read-ahead step includes a read control step for determining, according to the moving speed of the cursor, a range for reduced-size images to be read from the recording medium and stored in the memory.

Thus, reduced-size images to be read ahead are determined according to the moving speed of the cursor. Therefore, reduced-size images which are likely to be displayed can be read ahead.

It is preferable that in the read control step, the higher the moving speed of the cursor is, the more reduced-size images in a moving direction of the cursor are included in the range.

Thus, even if the moving speed of the cursor is increased, read-ahead can be effectively performed.

It is preferable that in the read control step, when the moving speed of the cursor is lower than a predetermined speed, reduced-size images located in an opposite direction to a moving direction of the cursor are included in the range.

Thus, reduced-size images located in the opposite direction to the moving direction of the cursor, so that read-ahead can be effectively performed for the case where a user changes the direction of moving the cursor.

It is preferable that the image read-ahead step includes a memory utilization detection step of detecting a utilization of a memory, a free area comparison step of comparing, based on the utilization of the memory, a size of a free area in the memory to a size of the reduced-size images to be stored, and a storage control step of determining, when the size of the free area in the memory is smaller than the size of the reduced-size images to be stored, reduced-size images to be discarded from the memory, based on a detection result of the cursor movement detection step, and overwriting and storing the reduced-size images to be stored in a region of the memory in which the reduced-size images to be discarded.

Thus, when the size of the free area in the memory is not large enough, reduced-size images newly read ahead are overwritten on reduced-size images which have been already stored in the memory and are to be discarded. Reduced-size images to be discarded are determined according to the moving speed of the cursor. Accordingly, reduced-size images which are likely to be displayed can be stored in the memory.

It is preferable that the image read-ahead step includes a main image reading step of reading, if the cursor is stopped for a predetermined time, a main image corresponding to a reduced-size image pointed by the cursor from the recording medium and storing the main image in the memory, and a data holding control step of holding, when an interrupt is generated and a percentage of completion of reading the main image is higher than a predetermined percentage of completion, data of the main image stored in the memory and discarding, when the percentage of completion of reading the main image is lower than the predetermined percentage of completion, data of the main image stored in the memory.

Thus, not reduced-size images but a main image is read ahead depending on the movement of the cursor. Even when an interrupt is generated while the main image is read, data already stored in a memory is discarded according to a percentage of completion of the data. Therefore, even a main image can be reproduced within a short waiting time and also the memory can be efficiently used.

It is preferable that in the cursor movement detection step, a moving speed of the cursor is detected based on a signal generated according to a rotation of an operated operation section.

Thus, a cursor can be moved according to a signal generated by the operation section.

The present invention provides an image reproduction device comprising: a memory control section for reading a plurality of reduced-size images or a main image and storing the reduced-size images or the main image in a memory; a decompression circuit for decompressing the plurality of reduced-size images or the main image; a signal processing circuit for multi-displaying the plurality of reduced-size images on a monitor; and a control section for detecting a moving speed of a cursor indicating a selected reduced-size image from the plurality of reduced-size images multi-displayed on the monitor and determining images to be read from the recording medium and stored in the memory according to the moving speed of the cursor.

Thus, read-ahead of images is performed according to the moving speed of the cursor indicating a selected reduced-size image. Therefore, proper read-ahead can be performed to reproduce images within a short waiting time.

It is preferable that the control section determines a range of the reduced-size images to be read from the recording medium and stored in the memory according to the moving speed of the cursor.

Thus, reduced-size images to be read ahead are determined according to the moving speed of the cursor. Therefore, reduced-size images which are likely to be displayed can be read ahead.

It is preferable that the cursor is stopped for a predetermined time, the memory control section reads a main image corresponding to a reduced-size image pointed by the cursor from the recording medium and stores the main image in the memory, and the control section holds, when an interrupt is generated and a percentage of completion of the main image is higher than a predetermined percentage of completion, data of the main image stored in the memory, and determines, when the percentage of completion of the main image is lower than the predetermined percentage of completion, that the data of the main image stored in the memory is discarded.

Thus, not reduced-size images but a main image is read ahead depending on the movement of the cursor. Even if an interrupt is generated while the main image is read, data which has been already stored in the memory is discarded according to the percentage of completion. Therefore, even a main image can be reproduced within a short waiting time and also the memory can be efficiently used.

The present invention provides a digital camera comprising: a memory; a monitor; a memory control section for reading a plurality of reduced-size images or a main image and storing the reduced-size images or the main image in the memory; a decompression circuit for decompressing the plurality of reduced-size images or the main image; a signal processing circuit for multi-displaying the plurality of reduced-size images on the monitor; and a control section for detecting a moving speed of a cursor indicating a selected reduced-size image from the plurality of reduced-size images multi-displayed on the monitor and determining images to be read from the recording medium and stored in the memory according to the moving speed of the cursor.

Thus, read-ahead of images is performed according to the moving speed of the cursor indicating a selected reduced-size image. Therefore, proper read-ahead can be performed to reproduce images within a short waiting time.

According to the present invention, read-ahead from a recording medium is performed according to a moving speed of a cursor. Thus, an image can be stably reproduced within a short waiting time.

BRIEF DESCRIPTION OF THE DRAWINGS

FIG. 4A is a view illustrating a range for read-ahead of thumbnail images in the case where a moving speed of a cursor is high; and FIG. 4B is a view illustrating a range for read-ahead of thumbnail images in the case where a moving speed of a cursor is low.

DESCRIPTION OF THE PREFERRED EMBODIMENTS

Hereafter, embodiments of the present invention will be described with reference to the accompanying drawings.

Figure 1:
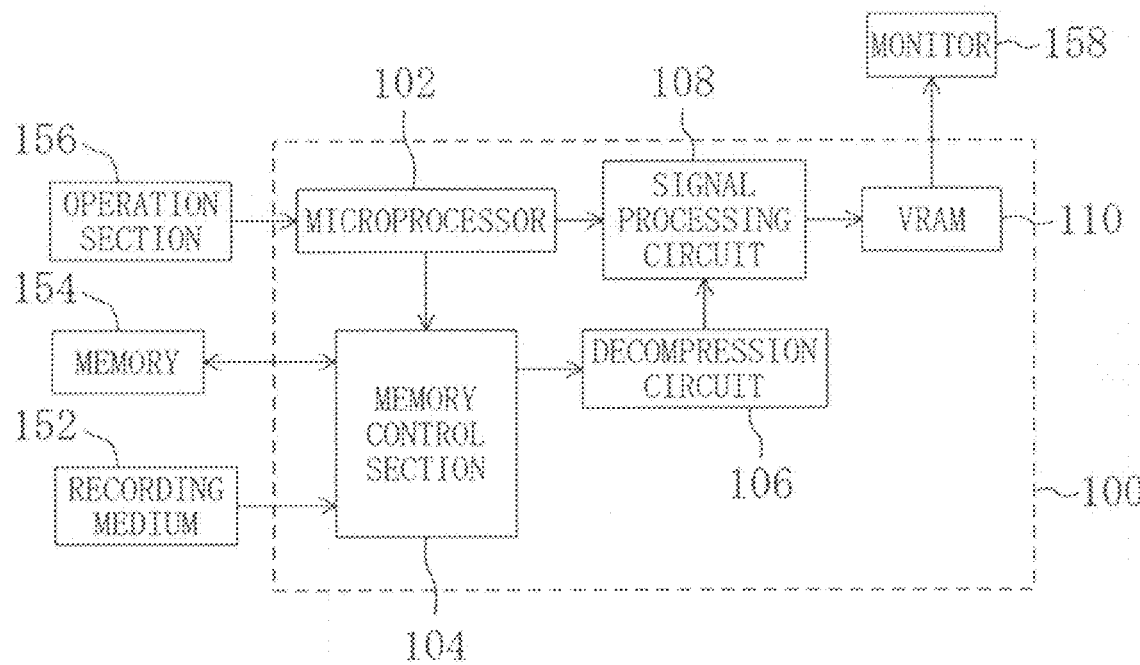
FIG. 1 is a block diagram illustrating a configuration of an image reproduction device according to an embodiment of the present invention.

FIG. 1 is a block diagram illustrating a configuration of an image reproduction device according to an embodiment of the present invention. An image reproduction device 100 of FIG. 1 reproduces images such as thumbnail images (reduced-size images), a main image and the like. The image reproduction device 100 includes a microprocessor 102 as a control section, a memory control section 104, a decompression circuit 106, a signal processing circuit 108 and a VRAM (video random access memory) 110. In FIG. 1, the image reproduction device 100, a memory 154, an operation section 156 and a monitor 158 together form a digital camera.

To select a thumbnail image in a multi-reproduction mode (at a time of multi-reproduction display), the operation section 156 is used. The operation section 156 outputs a signal indicating movement and determination of a cursor to the microprocessor 102. As the operation section 156, for example, a jog shuttle switch is used.

A recording medium 152 stores image data. The recording medium 152 is, for example, a SD (secure digital) memory card or a multi-media card. The recording medium 152 is removable and is attached to the image reproduction device 100. The memory 154 is a DRAM (dynamic random access memory) and is capable of reading/writing at higher speed than a reading/writing speed of the recording medium 152.

The microprocessor 102 controls the image reproduction device 100 as a whole. Specifically, the microprocessor 102 performs detection of a signal output from the operation section 156 and outputs a signal for controlling the memory control section 104 and the signal processing circuit 108. According to a control signal from the microprocessor 102, the memory control section 104 reads image data from the recording medium 152 and stores the image data in the memory 154. Moreover, the memory control section 104 reads the image data from the memory 154 and outputs the image data to the decompression circuit 106.

The decompression circuit 106 decompresses coded image data which has been received from the memory control section 104 and outputs the decompressed image data to the signal processing circuit 108. The signal processing circuit 108 converts the image data so that the image data has a size for display, writes the converted image data as a YC signal on the VRAM 110 and displays the image data on the monitor 158.

Figure 2:
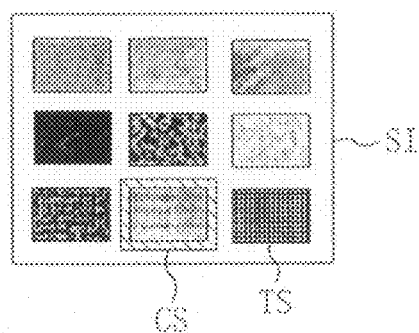
FIG. 2 is a diagram showing an exemplary screen display of a monitor in a multi-reproduction mode.

FIG. 2 is a diagram showing an exemplary screen display of the monitor 158 in a multi-reproduction mode. In a screen display SI in a multi-reproduction mode, a plurality of reduced-size images are displayed and selected one of the images is surrounded by a closing line CS. FIG. 2 shows that an image located in the center of the lowest row is selected. The closing line CS corresponds to a cursor indicating a selected image and moves in any direction toward top, bottom, left or right by a user who operates the operation section 156.

If a signal indicating a start of a multi-reproduction mode from the operation section 156 is detected, the microprocessor 102 segments all the image data in the recording medium 152 from the beginning with 9 frames as a unit. Then, the microprocessor 102 displays images of a single unit (9 frames) in one page and controls the memory control section 104 and the signal processing circuit 108 so that a display screen is changed one page by one page according to movement of the cursor by an operation of a user. The number of frames per page is not limited to 9 but may be an arbitrary number.

Figure 3:
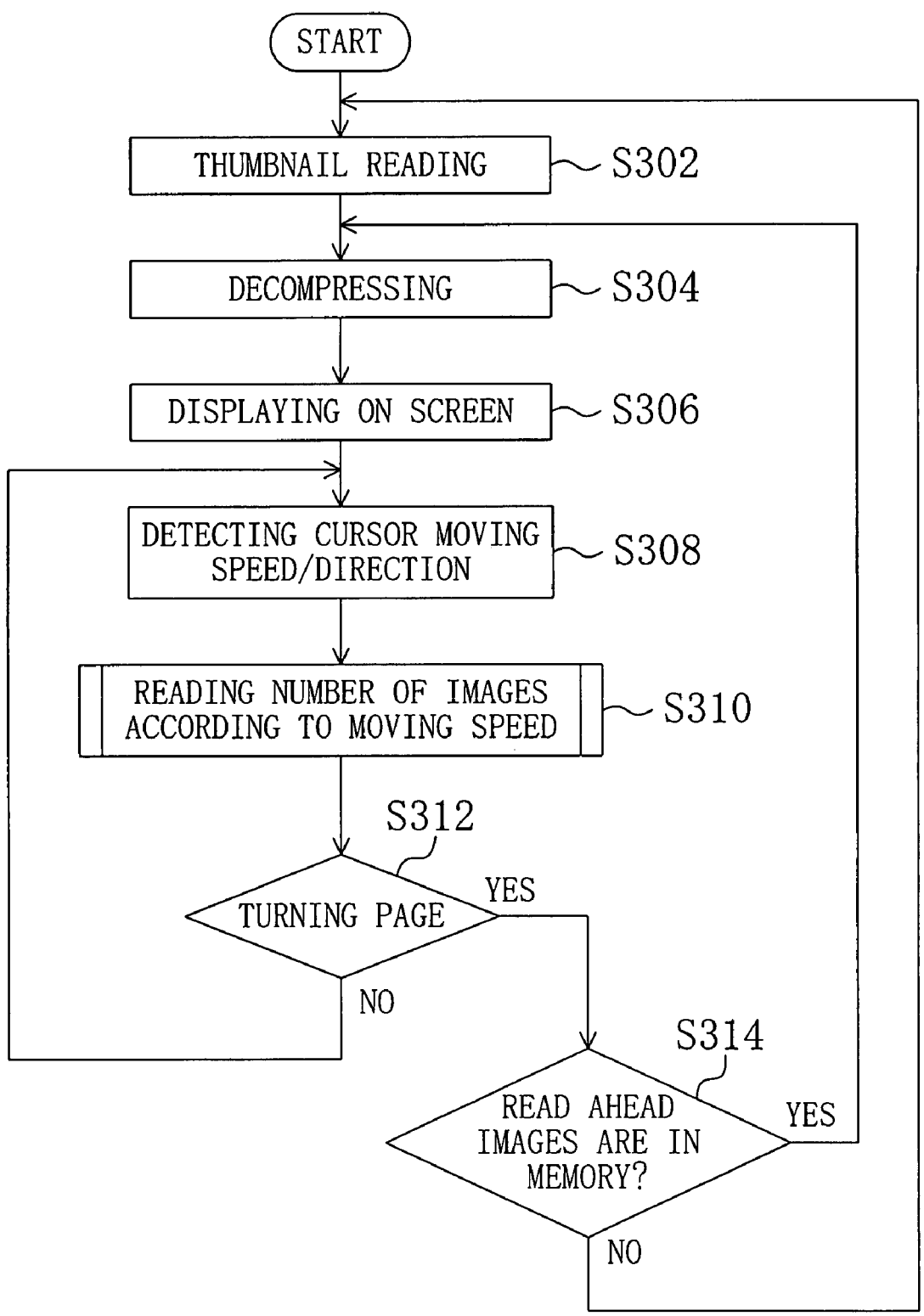
FIG. 3 is a flow chart showing procedures of an operation in a multi-reproduction mode.

FIG. 3 is a flow chart showing procedures of an operation in a multi-reproduction mode. If a signal indicating a start of a multi-reproduction mode from the operation section 156 is detected, the microprocessor 102 controls the entire system so that thumbnail images are read from the recording medium 152 and stored in the memory 154 (Step S302), of the thumbnail images stored in the memory 154, thumbnail images corresponding to a single page are decompressed (Step S304), and a multi-reproduction screen is displayed in the monitor 158 (Step S306).

The cursor is moved by an operation by the user for selecting an image and the microprocessor 102 detects a moving speed (as well as moving direction) of the cursor at this time (Step S308). For example, if the operation section 156 is a jog shuttle switch, a signal is generated according to a rotation of the jog shuttle switch. The microprocessor 102 calculates the moving speed by calculating the number of rotations of the jog shuttle switch in a predetermined time and detects a rotation direction from the order of signals generated by the rotations.

Next, the microprocessor 102 controls the memory control section 104 so that thumbnail images corresponding to a moving speed of the cursor which has been detected in Step S308 or a main image are read from the recording medium 152 as read-ahead images and the images are stored in the memory 154 (Step S310).

Next, the microprocessor 102 performs judgment on whether or not a page is changed by movement of the cursor (Step S312). If it is judged that a page has been changed in the Steps 312, then the microprocessor 102 performs judgment on whether or not read-ahead images of a page to be newly displayed exist in the memory 154 (Step S314). If it is judged that a page has not been changed in the Step S312, then the microprocessor 102 returns the process to the Step S308.

Next, if it is judged that read-ahead images exist in the memory 154 in the Step S314, then the microprocessor 102 returns the process to the Step S304, decompresses thumbnail images in a page to be newly displayed and then displays the thumbnail images in a multi-reproduction screen. If it is judged that read-ahead images do not exist in the memory 154, then the microprocessor 102 returns the process to Step S302, reads thumbnail images in a page to be newly displayed from the recording medium 152 and stores the images in the memory 154.

In read-ahead of images, the microprocessor 102 reads data recorded in the recording medium 152 as it is, stores the data in the memory 154 and decompresses only part of the data to be displayed in the screen. Accordingly, compared to the case where all read data is decompressed and stored, a larger amount of image data can be read ahead.

FIGS. 4A and 4B are views illustrating a range of thumbnail images to be read ahead. FIGS. 4A and 4B illustrate control for adjusting a necessary number of images of image data which are to be read, according to a moving speed of a cursor for selecting an image. Each of CS1 and CS2 is a thumbnail image which is currently selected by a user. Each of RS1 and RS2 is a read-ahead range.

FIG. 4A shows the case where a moving speed of a cursor is high. In this case, read-ahead of thumbnail images (RS1) is started from the currently selected image CS1 in a wide range along a moving direction (toward right) of the cursor.

FIG. 4B shows the case where a moving speed of a cursor is low. In this case, thumbnail images (RS2) around the currently selected image CS2 are read ahead. Specifically, thumbnail images in the opposite direction to the moving direction of the cursor are included in a read-ahead range. The read-ahead range may include the same number of pages in both of the forward and backward directions from the currently selected image CS2. Alternatively, the read-ahead range may include more pages in the moving direction of the cursor.

Figure 5:
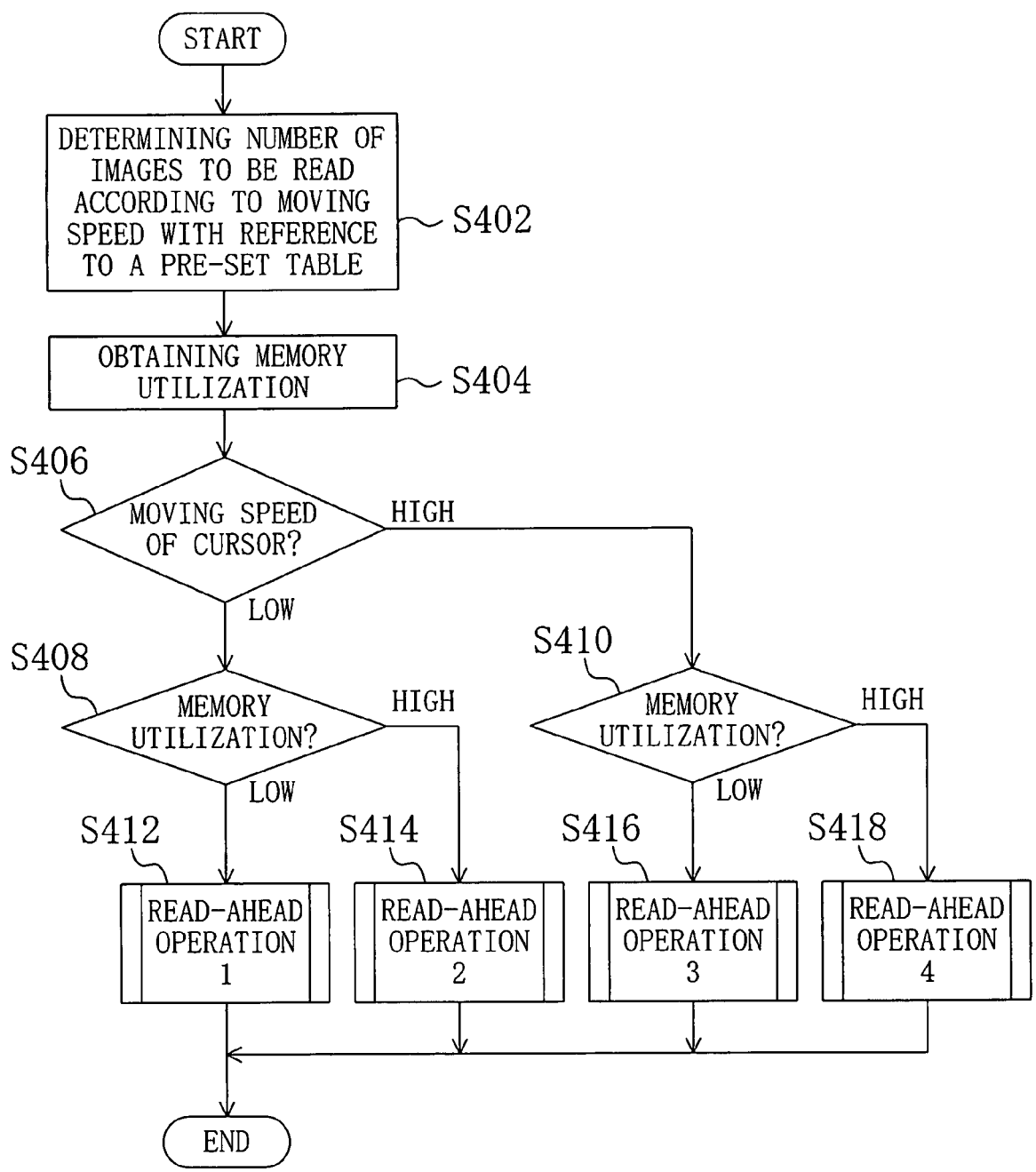
FIG. 5 is a flow chart showing a flow of an operation in Step S310 of FIG. 3.
Figures 6, 7:
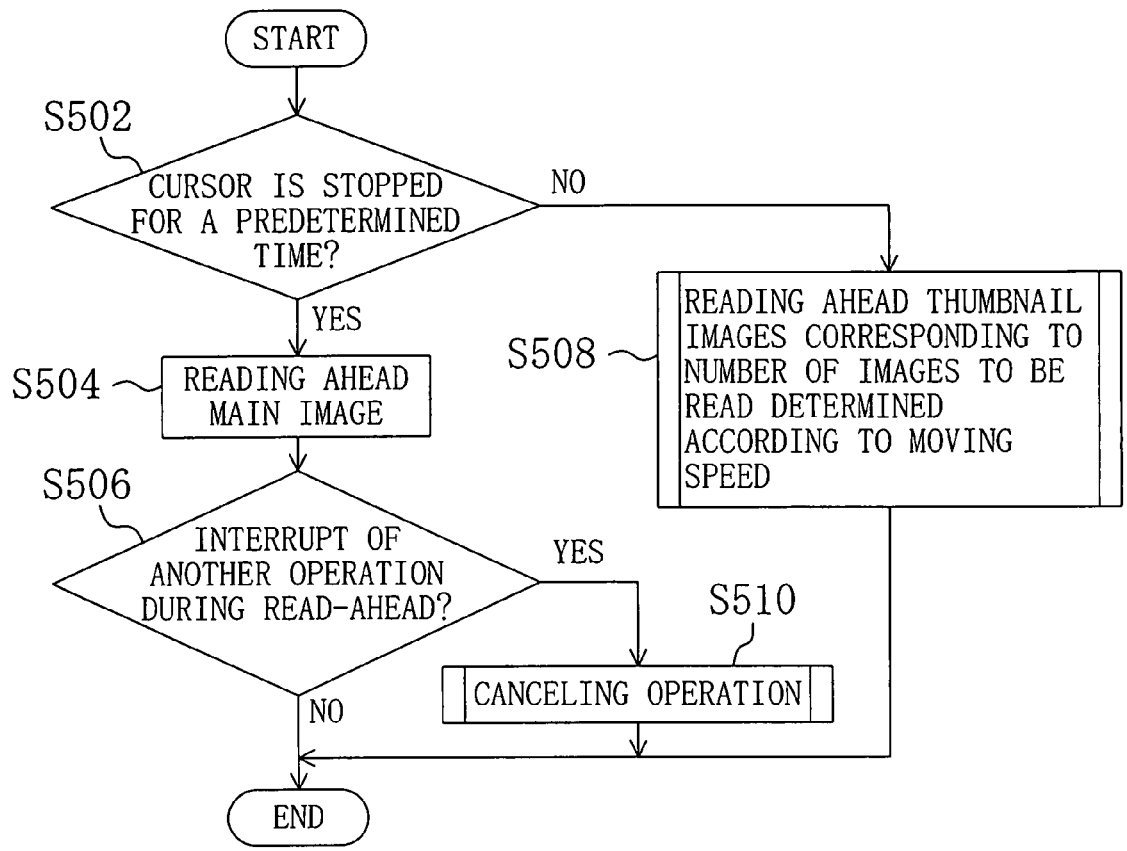
FIG. 6 is a table showing an example in which a moving speed of a cursor and a range of images to be read correspond to one another.
FIG. 7 is a flow chart showing procedures of a read-ahead operation 1 (Step S412) of FIG. 5.

FIG. 5 is a flow chart showing a flow of an operation in Step S310 of FIG. 3. FIG. 6 is a table showing an example in which the moving speed of a cursor and a range of images to be read correspond to one another. When the operation of Step S310 is started, the microprocessor 102 determines a range of images to be read according to the moving speed of the cursor (Step S402). The range of images to be read is determined with reference to the table of FIG. 6 showing the correspondence between the moving speed of the cursor and the number of images to be read which has been set beforehand.

As shown in FIG. 6, only when the moving speed of the cursor is 0, the microprocessor 102 controls the memory control section 104 so that not thumbnail images but a main image pointed by the cursor is read from the recording medium 152 and the main image is stored in the memory 154. When the moving speed of the cursor is other than 0, the microprocessor 102 controls the memory control section 104 so that the higher the moving speed is, the more images are read from the recording medium 152 and stored in the memory 154.

Moreover, as shown in FIG. 6, for the direction of reading of images, there are two modes, i.e., a mode in which data is read from previous and next pages of a page including an image currently pointed by the cursor and a mode in which data is read only from pages in the moving direction of the cursor. As has been described with reference to FIG. 4, when the moving speed of the cursor is low, data is read beforehand from previous and next pages of a page of an image currently pointed by the cursor. When the moving speed of the cursor is high, it is highly possible that the user is looking for a certain image in the moving direction and thus only pages in the moving direction of the cursor are read beforehand. The moving speed of the cursor as a threshold of switching between the two modes is determined by the user beforehand.

Next, the microprocessor 102 obtains a utilization of the memory 154 (Step S404) and performs judgment on whether the moving speed of the cursor detected in Step S308 of FIG. 3 is high or low (Step S406). If it is judged that the moving speed is low, then the microprocessor 102 performs judgment on whether the utilization of the memory 154 obtained in the Step S404 is high or low (Step S408). If the utilization of the memory 154 is judged to be low, then the microprocessor 102 performs a read-ahead operation 1 (Step S412). If the utilization is judged to be high, then the microprocessor 102 performs a read-ahead operation 2 (Step S414).

Even if the moving speed of the cursor is judged to be high in Step S406, the microprocessor 102 performs judgment on whether the utilization of the memory 154 obtained in Step S404 is high or low (Step S410). If the utilization of the memory 154 is judged to be low, then the microprocessor 102 performs a read-ahead operation 3 (Step S416). If the utilization is judged to be high, then the microprocessor 102 performs a read-ahead operation 4 (Step S418). Any one of the read-ahead operations 1 through 4 is performed, and the step S310 is completed. Detail description of the read-ahead operations 1 through 4 (Steps S412, S414, S416 and S418) will be given later.

FIG. 7 is a flow chart showing procedures of the read-ahead operation 1 (Step S412) of FIG. 5. When the moving speed of the cursor is low, it is highly possible that the user will select reproduction of a main image next and thus, in the read-ahead operation, the microprocessor 102 performs control so that a main image is read in priority to thumbnail images.

When the read-ahead operation 1 is started, the microprocessor 102 performs judgment on whether the cursor is stopped for a predetermined time (Step S502). The microprocessor 102 measures a stop time of the cursor while the user does not perform an operation to the operation section 156 and resets, when the user performs an operation to the operation section 156, the measured stop time. The predetermined time can be set beforehand for the user's own convenience.

If it is judged that the cursor has stopped for the predetermined time in Step S502, the memory control section 104 reads ahead a main image corresponding to a thumbnail image pointed by the cursor (Step S504). If it is judged that the cursor has not stopped for the predetermined time, the memory control section 104 reads ahead a predetermined number of images which have been determined in Step S402 of FIG. 5 (Step S508).

If an interrupt by another operation is generated (Step S506) while a main image is read in Step S504, the microprocessor 102 performs a canceling operation (Step S510). A main image has a large size and it takes a longer time to read the main image and thus, when another operation such as moving of the cursor or the like is generated in the middle of reading the main image, an canceling operation is performed to cancel reading of the main image and perform a new operation in priority. Any one of Steps of S506, 508 and 510 is performed, and the read-ahead operation 1 is completed.

Figure 8:
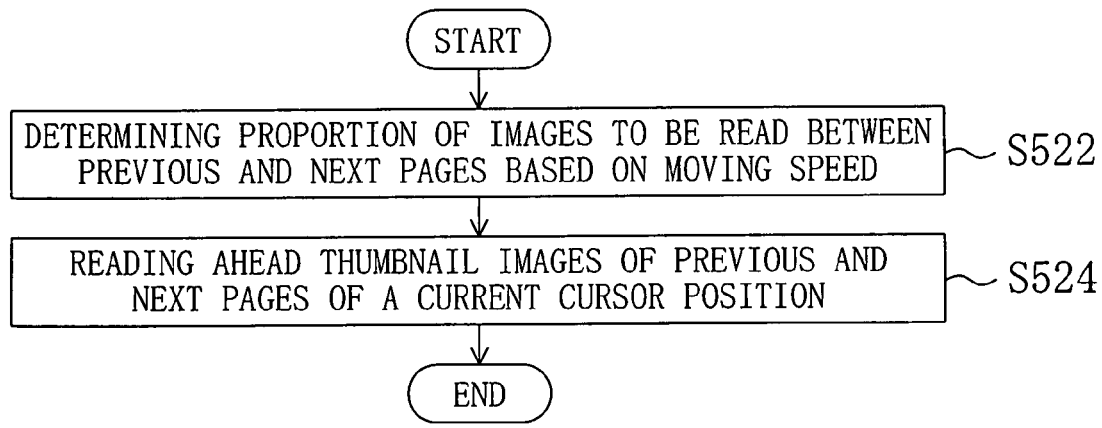
FIG. 8 is a flow chart showing procedures of an operation of Step 508 of FIG. 7.

FIG. 8 is a flow chart showing procedures of the operation of Step 508 of FIG. 7. When the operation is started, the microprocessor 102 determines, according to the moving speed of the cursor, the direction in which images are read and, if data is read in both of the forward and backward directions, the proportion of the number of images to be read between the forward and backward directions (Step S522). The reading direction and the proportion of the number of images to be read are determined with reference to a table showing the correspondence to the moving speed of the cursor which has been set beforehand. As has been described with reference to FIG. 4 and FIG. 6, when the moving speed of the cursor is high, control for reading only thumbnail images in pages in the forward direction from a current cursor position can be performed. When the moving speed of the cursor is low, control for reading thumbnail images in previous and next pages of a current cursor position can be performed.

Next, the memory control section 104 reads ahead necessary images according to the number of images determined in Step S402 of FIG. 5 and the direction and the proportion determined in Step S522 (Step S524). If the necessary images already exist in the memory 154, a new reading operation is not performed. Step S524 is performed, and the operation is completed.

When thumbnail images which have been read fill up a memory, the reading operation is temporarily stopped. However, when page turning occurs, in order to adjust the number of images to be read ahead from the previous and next pages of the cursor, a memory region in which thumbnail images less likely to be displayed are stored is overwritten with thumbnail images likely to be displayed and have been newly read.

Figure 9:
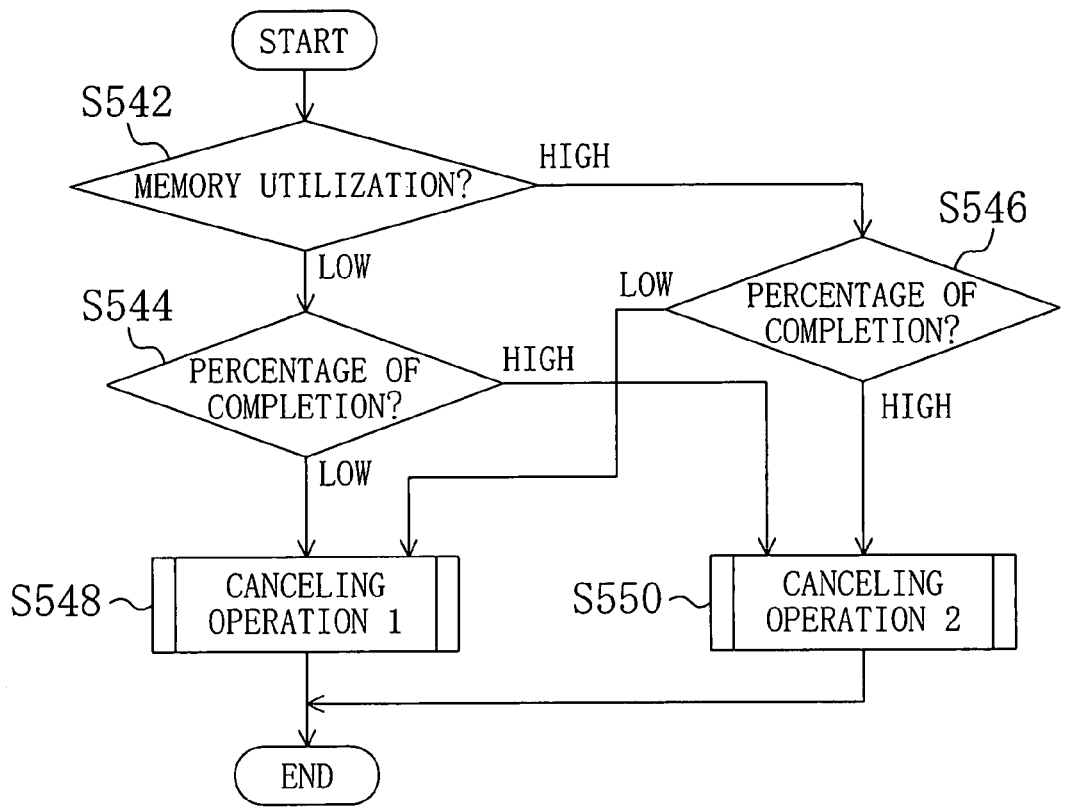
FIG. 9 is a flow chart showing procedures of a canceling operation (Step S510) of FIG. 7.

FIG. 9 is a flow chart showing procedures of the canceling operation (Step S510) of FIG. 7. When a canceling operation is started, the microprocessor 102 performs judgment on whether the utilization of the memory 154 obtained in Step S404 of FIG. 5 is high or low (Step S542). If the utilization of the memory 154 is judged to be low, then the microprocessor 102 calculates a percentage of completion of reading main image data and performs judgment on whether the percentage of completion is high or low (Step S544). The percentage of completion is the ratio of a size of the main image data which has been read by the memory 154 at a time when a canceling operation is started to a data size of the main image. Whether the percentage of completion is high or low is judged using a threshold set by the user beforehand.

If it is judged that the percentage of completion is lower than a predetermined percentage of completion in Step S544, then the microprocessor 102 performs a canceling operation 1 (Step S548). If the percentage of completion is judged to be higher than the predetermined percentage of completion in Step S544, the microprocessor 102 performs a canceling operation 2 (Step S550).

If it is judged that the utilization of the memory 154 is high in the Step S542, then the microprocessor 102 calculates the percentage of completion of reading the main image data and performs judgment on whether the percentage of completion is high or low (Step S546).

If it is judged that the percentage of completion is low in Step S546, then the microprocessor 102 performs the canceling operation 1 (Step S548). If it is judged that the percentage of completion is high in Step S546, then the microprocessor 102 performs the canceling operation 2 (Step S550). The canceling operation 1 or the canceling operation 2 is performed, and the canceling operation is completed.

Figure 10:
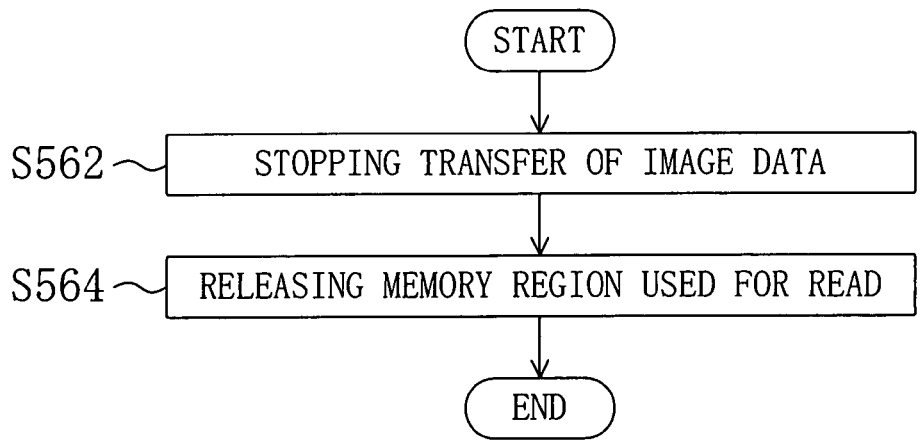
FIG. 10 is a flow chart showing procedures of a canceling operation 1 (Step S548) of FIG. 9.

FIG. 10 is a flow chart showing procedures of the canceling operation 1 (Step S548) of FIG. 9. When the canceling operation 1 is started, the microprocessor 102 stops reading of image data (Step S562), the memory region used for reading is released in the memory 154 (Step S564) and the canceling operation 1 is completed.

Figure 11:
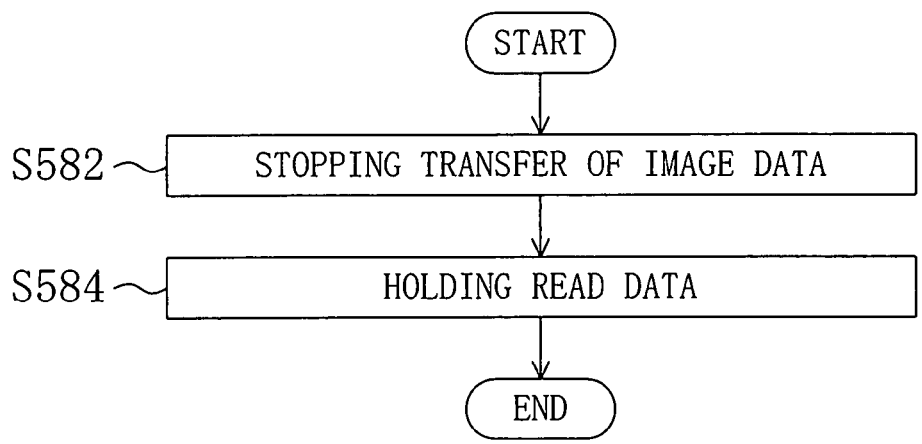
FIG. 11 is a flow chart showing procedures of a canceling operation 2 (Step S550) of FIG. 9.

FIG. 11 is a flow chart showing procedures of the canceling operation 2 (Step S550) of FIG. 9. When the canceling operation 2 is started, the microprocessor 102 stops reading of image data (Step S582) and image data read into the memory 154 is held (Step S584). Thereafter, the canceling operation 2 is completed.

As described above, even in the case where cancellation of a read operation occurs, when the percentage of completion is high, data which has been already read is not discarded but maintained. Thus, next time when the user selects the same main image, a read-ahead operation can be performed at increased speed.

Figure 12:
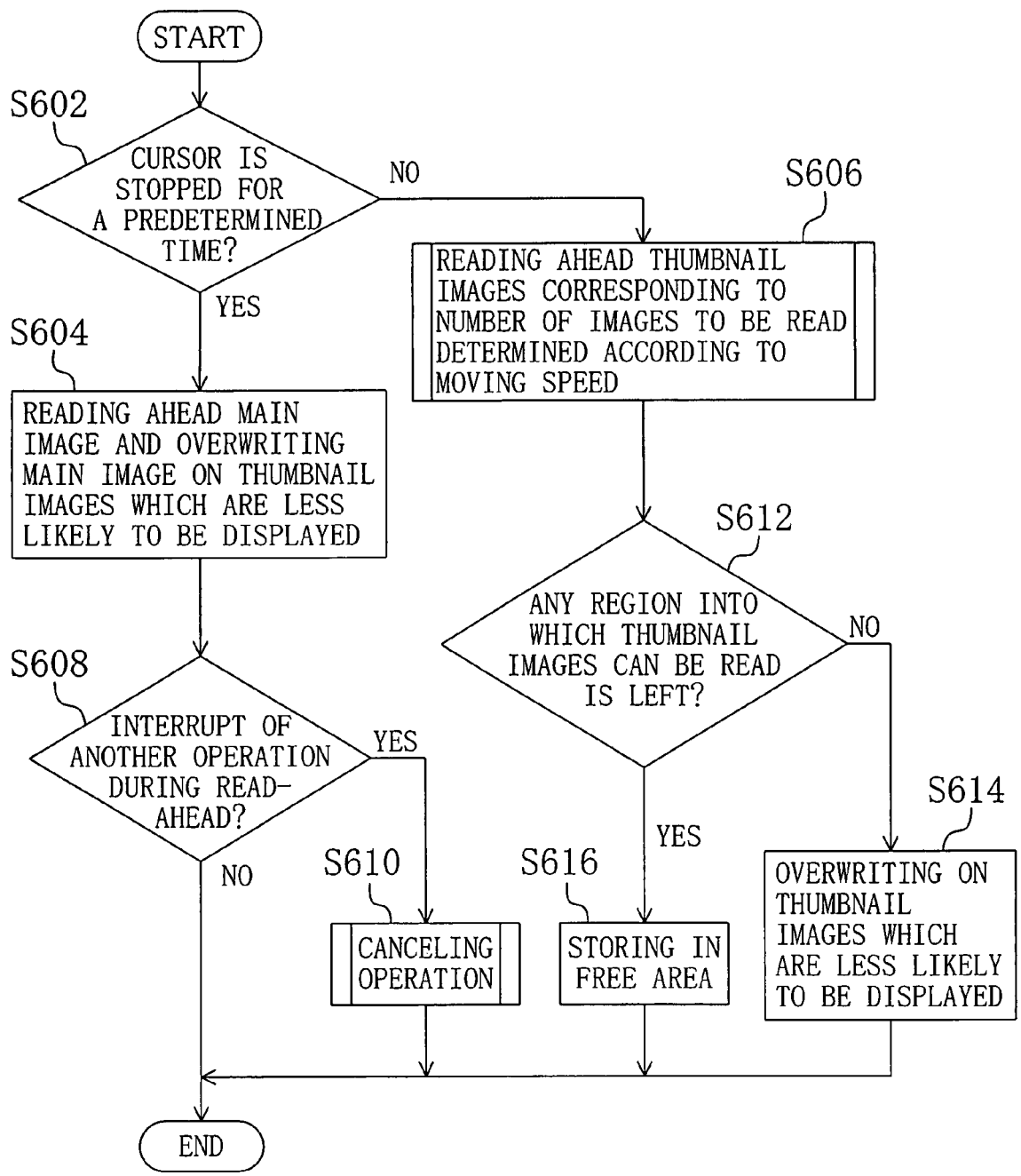
FIG. 12 is a flow chart showing procedures of a read-ahead operation 2 (Step S414) of FIG. 5.

FIG. 12 is a flow chart showing procedures of the read-ahead operation 2 (Step S414) of FIG. 5. When the moving speed of the cursor is low, it is highly possible that the user selects reproduction of a main image next. Thus, in the read-ahead operation 2, the microprocessor 102 performs control so that a main image is read in priority to thumbnail images.

When the read-ahead operation is started, the microprocessor 102 performs judgment on whether the cursor is stopped for a predetermined time (Step S602). If it is judged that the cursor is stopped for the predetermined time, in Step S602, the memory control section 104 reads ahead a main image. The microprocessor 102 determines that thumbnail images which have been already read ahead and are less likely to be displayed are thumbnail images which are to be discarded. The memory control section 104 overwrites the thumbnail images in a memory region in which the thumbnail images to be discarded are stored (Step S604).

Thumbnail images which are less likely to be displayed are calculated using the number of images to be read which has been determined according to the moving speed of the cursor and how many pages away from a current position of the cursor, i.e., a distance from the cursor. On the other hand, thumbnail images which are likely to be displayed are, for example, images existing in the moving direction of the cursor. The higher the moving speed of the cursor becomes, the higher the possibility that images in a wider range in the moving direction of the cursor are displayed becomes. In contrast, when the moving speed of the cursor is reduced, the possibility that images existing in the opposite direction to the moving direction of the cursor are displayed is increased and the possibility that images located far from the cursor in the moving direction of the cursor are displayed is reduced.

If an interrupt of another operation is generated (Step S608) while a main image is read in Step S604, the microprocessor 102 performs a canceling operation (Step S610). In Step S610, the same operation as that of FIG. 9 is performed.

If it is judged that the cursor is not stopped for a predetermined time in Step S602, the memory control section 104 reads ahead images corresponding to the number determined in Step S402 of FIG. 5 (Step S606). In Step S606, the same operation as that of FIG. 8 is performed.

In Step S612, the microprocessor 102 performs, according to the utilization of the memory 154 obtained in the Step S404 of FIG. 5, judgment on whether or not the memory 154 has a free area into which thumbnail images can be read. In Step S612, the microprocessor 102 detects a data size of read-ahead thumbnail images which are to be stored and a size of the free area of the memory 154 and compares the data size with the free area size, thereby performing the judgment.

If it is judged that there is a free area, the memory control section 104 stores thumbnail images in the free area (Step S616). If it is judged that there is no free area, the microprocessor 102 determines that thumbnail images which have been already read ahead and are less likely to be displayed are thumbnail images to be discarded. The memory control section 104 overwrites read-ahead thumbnail images in a memory region in which the thumbnail images to be discarded are stored (Step S614). Any one of Steps S608, S610, S614 and S616 is performed, and the read-ahead operation 2 is completed.

Figure 13:
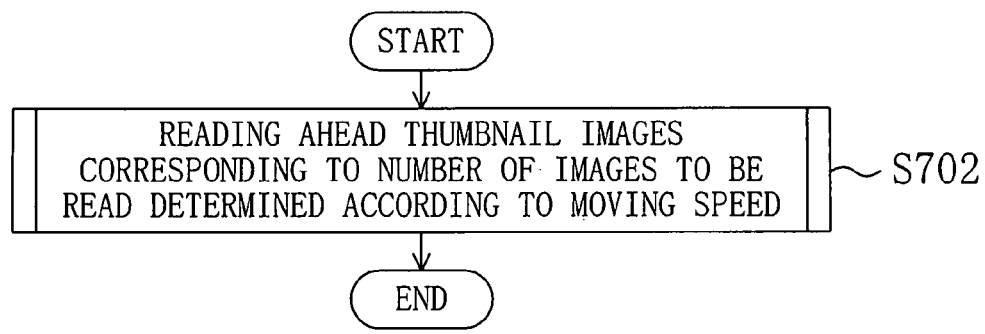
FIG. 13 is a flow chart showing procedures of a read-ahead operation 3 (Step S416) of FIG. 5.

FIG. 13 is a flow chart showing procedures of the read-ahead operation 3 (Step S416) of FIG. 5. When the moving speed of the cursor is high, the possibility that the user selects reproduction of a main image next is low and in the read-ahead operation 3, the microprocessor 102 performs control so that thumbnail images are read in priority to the main image. When the read-ahead operation 3 is started, the memory control section 104 reads ahead images corresponding to the number determined in Step S402 of FIG. 5 (Step S702). In Step S702, the same operation as that of FIG. 8 is performed. Step S702 is performed, and the read-ahead operation 3 is completed.

Figure 14:
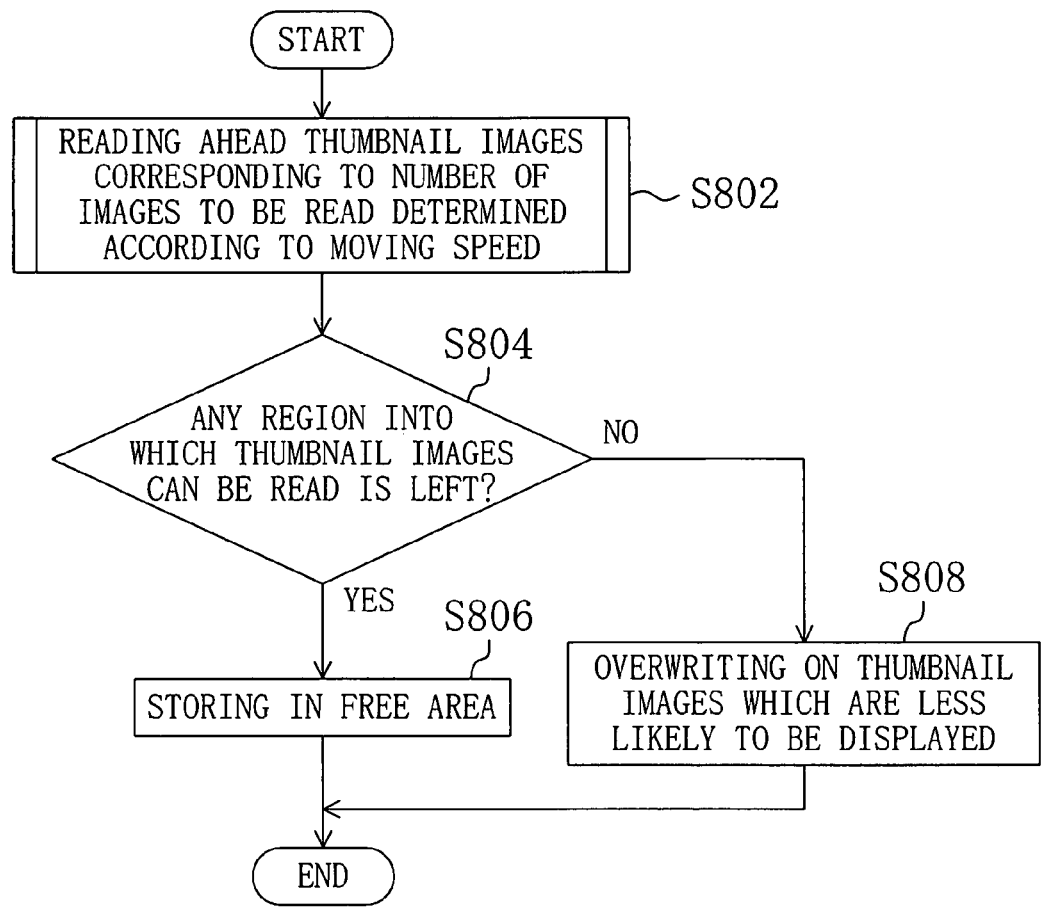
FIG. 14 is a flow chart showing procedures of a read-ahead operation 4 (Step S418) of FIG. 5.

FIG. 14 is a flow chart showing procedures of the read-ahead operation 4 (Step S418) of FIG. 5. When the moving speed of the cursor is high, the possibility that the user selects reproduction of a main image next is low and in the read-ahead operation 4, the microprocessor 102 performs control so that thumbnail images are read in priority to the main image. When the read-ahead operation 4 is started, the memory control section 104 reads ahead images corresponding to the number determined in Step S402 (Step S802) of FIG. 5. In the Step S802, the same operation as that of FIG. 8 is performed.

In Step S804, the microprocessor 102 performs, according to the utilization of the memory 154 obtained in Step S404 of FIG. 5, judgment on whether or not the memory 154 has a free area into which thumbnail images can be read.

If it is judged that there is a free area, the memory control section 104 stores thumbnail images in the free area (Step S806). If it is judged that there is no free area, the microprocessor 102 determines that thumbnail images which have been already read ahead and are less likely to be displayed are thumbnail images to be discarded. The memory control section 104 overwrites read-ahead thumbnail images in a memory region in which the thumbnail images to be discarded are stored (Step S808). Step S806 or S808 is performed, and the read-ahead operation 4 is completed.

In reading ahead of thumbnail images, a read-ahead operation may be performed such that only a certain amount of image data is read, thereby increasing the speed of read-ahead. For example, for image data in the form of JPEG (Joint Photographic Experts Group), a size of data to be read is fixed to 64 KB. Thus, a data size of thumbnail images to be read ahead does not have to be checked, thus resulting in increase of the speed of reading.

An image reproduction device according to the present invention can display images stored in a recording medium at high speed and thus is useful for digital equipment such as a digital camera, a DVD recorder and the like for reproducing images stored in a recording medium and the like.

What is claimed is:

1. An image reproduction method comprising:
a reduced-size image reading step of reading a plurality of reduced-size images from a recording medium and storing the reduced-size images in a memory;
a display step of multi-displaying the plurality of reduced-size images on a monitor;
a cursor movement detection step of detecting a moving speed of a cursor indicating a selected reduced-size image from the plurality of reduced-size images displayed on the monitor; and
an image read-ahead step of reading a group of a number of reduced-size images from the recording medium and of storing the group of reduced-size images in the memory, the number corresponding to the moving speed of the cursor,
wherein the image read-ahead step includes:
a main image reading step of reading, if the cursor is stopped for a predetermined time, a main image corresponding to a reduced-size image pointed by the cursor from the recording medium and storing the main image in the memory, and
a data holding control step of, upon interruption,
holds, when a percentage of completion of reading the main image is higher than a predetermined percentage of completion, data of the main image stored in the memory, and
discarding, when the percentage of completion of reading the main image is lower than the predetermined percentage of completion, data of the main image stored in the memory.

2. The image reproduction method of claim 1, wherein in the image read-ahead step, the higher the moving speed of the cursor is, the more reduced-size images in a moving direction of the cursor are included in the group.

3. The image reproduction method of claim 1, wherein in the image read-ahead step, when the moving speed of the cursor is lower than a predetermined speed, reduced-size images located in an opposite direction to a moving direction of the cursor are included in the group.

4. The image reproduction method of claim 1, wherein the image read-ahead step includes
a memory utilization detection step of detecting a utilization of a memory,
a free area comparison step of comparing, based on the utilization of the memory, a size of a free area in the memory to a size of the reduced-size images to be stored, and
a storage control step of determining, when the size of the free area in the memory is smaller than the size of the reduced-size images to be stored, reduced-size images to be discarded from the memory, based on a detection result of the cursor movement detection step, and overwriting and storing the reduced-size images to be stored in a region of the memory in which the reduced-size images to be discarded.

5. The image reproduction method of claim 1, wherein in the cursor movement detection step, a moving speed of the cursor is detected based on a signal generated according to a rotation of an operated operation section.

6. An image reproduction device comprising:
a memory control section for reading a plurality of reduced-size images or a main image and storing the reduced-size images or the main image in a memory;
a decompression circuit for decompressing the plurality of reduced-size images or the main image;
a signal processing circuit for multi-displaying the plurality of reduced-size images on a monitor; and
a control section for detecting a moving speed of a cursor indicating a selected reduced-size image from the plurality of reduced-size images multi-displayed on the monitor and determining a group of a number of reduced-size images which is to be read from the recording medium and stored in the memory, the number corresponding to the moving speed of the cursor,
wherein when the cursor is stopped for a predetermined time, the memory control section reads a main image corresponding to a reduced-size image pointed by the cursor from the recording medium and stores the main image in the memory, and
the control section, upon interruption,
holds, when a percentage of completion of reading the main image is higher than a predetermined percentage of completion, data of the main image stored in the memory, and
determines, when the percentage of completion of reading the main image is lower than the predetermined percentage of completion, that the data of the main image stored in the memory is discarded.

7. A digital camera comprising:
a memory;
a monitor;
a memory control section for reading a plurality of reduced-size images or a main image and storing the reduced-size images or the main image in the memory;
a decompression circuit for decompressing the plurality of reduced-size images or the main image;
a signal processing circuit for multi-displaying the plurality of reduced-size images on the monitor; and
a control section for detecting a moving speed of a cursor indicating a selected reduced-size image from the plurality of reduced-size images multi-displayed on the monitor and determining a group of a number of reduced-size images which is to be read from the recording medium and stored in the memory, the number corresponding to the moving speed of the cursor,
wherein when the cursor is stopped for a predetermined time, the memory control section reads a main image corresponding to a reduced-size image pointed by the cursor from the recording medium and stores the main image in the memory, and
the control section, upon interruption,
holds, when a percentage of completion of reading the main image is higher than a predetermined percentage of completion, data of the main image stored in the memory, and
determines, when the percentage of completion of reading the main image is lower than the predetermined percentage of completion, that the data of the main image stored in the memory is discarded.

* * * * *